United States Patent [19]

Sloan et al.

[11] Patent Number: 5,257,716
[45] Date of Patent: Nov. 2, 1993

[54] PIPE MANUFACTURING METHOD AND APPARATUS

[75] Inventors: Robert C. Sloan, Alliance, Ohio; William A. Martin, Volant; Woodrow S. Dixon, Mercer, both of Pa.

[73] Assignee: Armco Inc., Parsippany, N.J.

[21] Appl. No.: 942,965

[22] Filed: Sep. 10, 1992

[51] Int. Cl.$^5$ .................... B23K 37/047; B65G 47/46
[52] U.S. Cl. .................................... 228/147; 228/47; 228/155; 198/367; 29/822
[58] Field of Search .................... 228/147, 155, 47; 29/822; 198/367, 369

[56] References Cited

U.S. PATENT DOCUMENTS

| | | | |
|---|---|---|---|
| 1,535,075 | 4/1925 | Knap | 198/367 |
| 1,543,307 | 6/1925 | Wilson | |
| 1,918,772 | 7/1933 | Moon | |
| 2,670,835 | 3/1954 | Huttmann | 198/367 |
| 3,104,755 | 9/1963 | Zuercher | 198/135 |
| 3,236,360 | 2/1966 | Winter | 198/188 |
| 3,465,870 | 9/1969 | Paulsen | 198/188 |
| 3,484,655 | 12/1969 | Peltier | 317/137 |
| 3,535,484 | 10/1970 | Snow et al. | 228/231 |
| 3,599,789 | 8/1971 | Kurczak | 198/367 |
| 3,868,024 | 2/1975 | Lee | 214/1 |
| 4,258,850 | 3/1981 | Solaroli | 209/655 |
| 4,334,421 | 6/1982 | Ostlinning et al. | 72/257 |
| 4,363,394 | 12/1982 | Kirchhoff | 198/369 |
| 4,593,807 | 6/1986 | Cattaneo et al. | 198/457 |

FOREIGN PATENT DOCUMENTS 0331986 9/1984 European Pat. Off. ............ 198/367

OTHER PUBLICATIONS

Chapter 32, *The Making, Shaping and Treating of Steel*, 10th Edition, United States Steel (no date given).

Primary Examiner—Mark Rosenbaum
Assistant Examiner—Jeffrey T. Knapp
Attorney, Agent, or Firm—Webb, Burden, Ziesenheim & Webb

[57] ABSTRACT

A method and apparatus for transferring tubular products from one mill to another including a connecting table having the shape of a reverse curve. The table includes a base and two spaced apart walls attached to the base defining a passageway between the base and the sidewalls. A diverter is associated with the connecting table to divert metal product in a hot working state from a first conveying table onto the connecting table leading to a second conveying table. The connecting table preferably is associated with a welding and forming mill and a stretch reducing mill.

20 Claims, 4 Drawing Sheets

PIPE MANUFACTURING METHOD AND APPARATUS

BACKGROUND OF THE INVENTION

1. Field of the Invention

This invention relates to methods and apparatus for manufacturing metallic pipe and other tubular products and, more particularly, to the handling of the hot pipe and other tubular products in transferring them from one mill to another mill.

2. Description of the Prior Art

Generally, there are two hot working methods for manufacturing metallic tubular products and pipes, the butt weld method and the seamless tube method. The butt weld method utilizes a forming and welding mill. Skelp passes through a forming stand that forces the skelp into an arc of about 270°. Then the deformed metal edges pass over a welding horn and into a welding stand, where the edges are pressed together. Generally, a nozzle from the welding horn supplies oxygen to the edges of the skelp to further heat them before being pressed together. Further stands positioned downstream of the welding stand provide for reduction of diameter and a resultant change in wall thickness.

A stretch reducing mill may be utilized in series with the forming and welding mill to simultaneously reduce the diameter and the wall thickness of the tubular product by maintaining the tubular product under tension between mill stands.

Seamless tubular products are made by four basic methods: (1) rotary piercing of a solid round bar billet; (2) piercing a bloom or section of steel in a vertical press, leaving one end closed, and then processing by the roll forge process; (3) extruding a short, large diameter round in a hydraulic extrusion press; and (4) press piercing of a solid square billet. See *The Making, Shaping and Treating of Steel*, 10th Edition, ©1985, Chapter 32.

The present application is primarily directed to the butt weld method of forming pipe. Specifically, as shown in FIG. 1, a furnace 3 heats a straight piece of skelp as the skelp passes therethrough. The heated skelp, which is now in the hot working state, then enters the welding and forming mill 4 where the skelp is bent and edges are welded so that it is formed into a tubular product, such as a pipe. The tubular product is then cut to a predetermined length by a hot saw 5. A conveying table 6 then carries the tubular product to a cooling table.

However, should a steel mill want to modify this line to add a stretch reducing mill 10, then the line must be closed for months for modification and a second furnace 9 must be added at the end of conveying table 6. The second furnace heats the tubular product leaving the forming mill to a temperature which permits it to be hot worked before it then passes through a stretch reducing mill 10. The second furnace 9 is required because the tubular product cools to a point on the conveying table where it cannot be hot worked without being reheated prior to passing it through the stretch reducing mill 10.

The furnace 9 increases the cost of the finished product for several reasons: (1) the added fixed cost for the furnace; (2) the added cost due to the space requirements for the furnace; and (3) the added energy cost to heat the furnace.

Therefore, it is an object of our invention to provide a device that inexpensively transfers tubular products in a hot working state from one mill to another.

It is a further object of our invention to provide a device and method that passes tubular products in a hot working state from a welding and forming mill to a stretch reducing mill without the need to reheat the tubular product.

It is a further object of the present invention to provide a method and device that converts a welding and forming mill to a stretch reducing mill with a minimum amount of down time.

SUMMARY OF THE INVENTION

Our invention relates primarily to the use of a table connecting a first conveying table from a first mill to a second conveying table to the second mill. The connecting table is for transferring tubular metal products in a hot working state from the first mill to the second mill. The first conveying table has a first passageway through which the metal products pass. The connecting table includes a base having a first end connected with the one conveying table and a second end connected with the second conveying table. Two spaced apart sidewalls are attached to the base and a passageway is defined by the base and the sidewalls. The passageway of the connecting table is in the shape of a reverse curve. The axis thereof is in the shape of a reverse curve having two arcs whose centers are located on opposite sides of the connecting table. One of the arcs contain the first end of the connecting table and the other arc contains the second end of the connecting table. The connecting table further includes a diverter attached to the first conveying table for diverting the tubular metal product travelling down the first conveying table onto the first end of the connecting table so that the metal product can then pass along the connecting table onto the second conveying table. The diverter includes a two-position, movable diverting arm that blocks the first passageway in a first position and diverts the metal product from the first conveying table to said second connecting table.

The first conveying table has an upstream end and a downstream end. The first end of the connecting table is positioned between the upstream end and the downstream end of the first conveying table. The center of the first arc of the connecting table is positioned closer to the upstream end of the first conveying table than the center of the second arc of the connecting table and the two arcs can have equal radii.

The diverting arm is pivotably attached to the first conveying table and when the arm is in the second position the metal product travels only along the first conveying table and bypasses the connecting table. When the arm is in the first position, the metal product contacts the diverter arm and is diverted from the first conveying table onto the connecting table.

The conveying table includes a base and two spaced apart sidewalls attached to the base. When the diverter arm is in the second position, it forms a portion of the first conveying table sidewalls and when the diverter arm is in the first position, it forms a portion of one of the sidewalls of the connecting table.

The connecting table can be made of a plurality of segments each of which has two spaced apart sidewalls attached to a base, whereby the respective segments are attached to one another. The base of the connecting table can remain at a constant elevation or can be mounted in such a way as to provide a variation in elevation.

The diverter arm ordinarily includes a substantially flat plate having an inner surface and an outer surface, the inner surface being adapted to contact and divert the metal product, a hinge attached to the outer surface of the diverter arm and a locking mechanism.

The connecting table can be used in combination with a first mill and a second mill. The first mill can be a welding and forming mill and the second mill can be a stretch reducing mill.

Our invention further includes a method for transferring metallic tubular product from one mill to another comprising (a) heating a substantially straight elongated metallic tubular product to a hot working state; (b) passing the tubular product in the hot working state along a first conveying table; (c) diverting the tubular product in the hot working state from the first conveying table onto a connecting table substantially having the shape of a reverse curve; (d) passing the metal piece in the hot working state through the connecting table, whereby the substantially straight elongated product is deformed; and (e) passing the tubular product along the second conveying table while the tubular product is still in the hot working state. The product can first pass through a welding and forming mill and subsequently pass through a stretch reducing mill. Preferably, the tubular product, in the hot working state, passes directly from the connecting table to the second conveying table and the reducing mill without passing the tubular product through a furnace. The elongated tubular product can be cut into a plurality of elongated pieces before being passed along the first conveying table.

DESCRIPTION OF THE PREFERRED EMBODIMENTS

Figure 1:
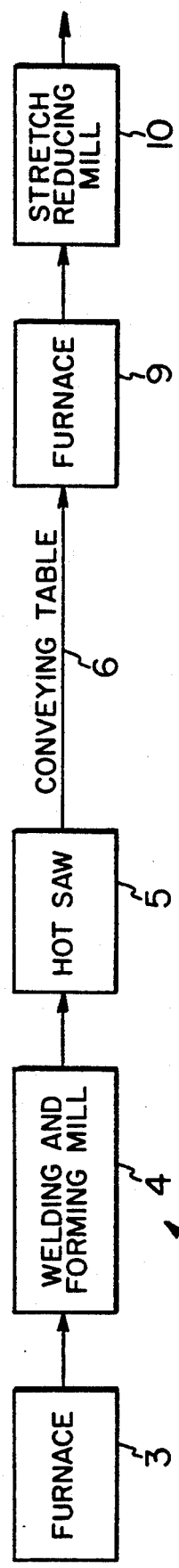
FIG. 1 is a schematic view of a prior art arrangement of a welding and forming mill and a stretch reducing mill.
Figure 2:
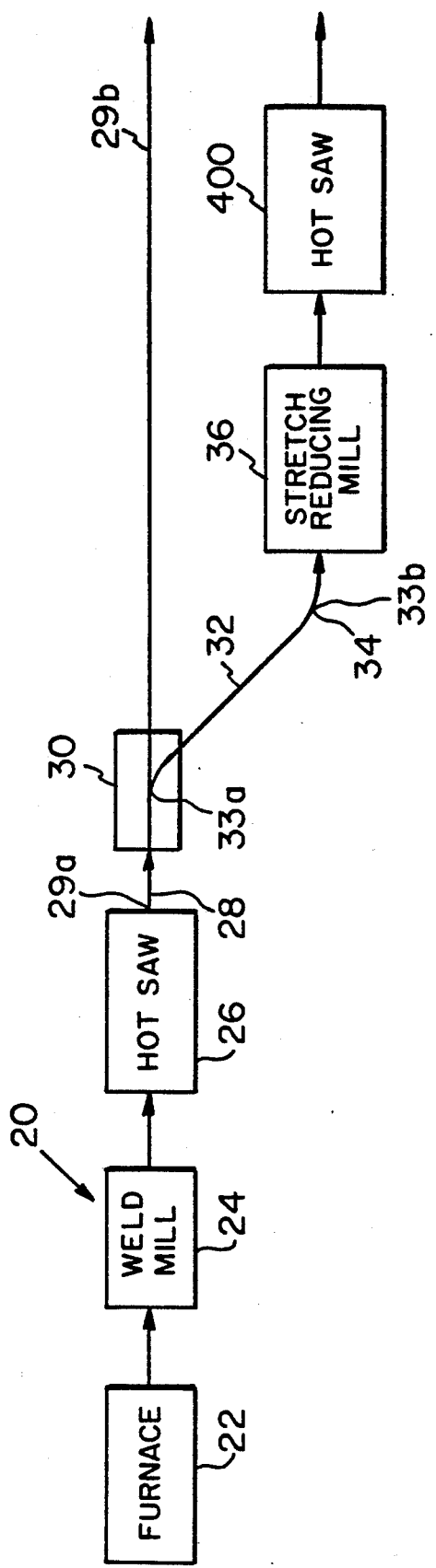
FIG. 2 is a schematic view of an arrangement for making tubular products having a welding and forming mill, a connecting table and a stretch reducing mill made in accordance with the present invention.

FIG. 2 shows an arrangement 20 for manufacturing tubular products of the present invention. The arrangement 20 includes a furnace 22 positioned upstream of a welding and forming mill 24, which is positioned upstream of a hot saw 26, which is positioned upstream of a conveying table 28. The conveying table 28 has an upstream end 29a and a downstream end 29b. A diverter 30 is positioned intermediate the ends of the conveying table 28. A connecting table 32 is connected to the conveying table 28 intermediate the conveying table ends 29a and 29b. The connecting table 32 also has an upstream end 33a and a downstream end 33b. Connecting table end 33b connects to a conveying table 34. Conveying table 34 leads to a stretch reducing mill 36. The conveying tables 28 and 34 are well-known in the art.

The furnace 22, welding and forming mill 24, hot saw 26 and the stretch reducing mill 36 are known in the art and therefore will not be explained in any further detail.

Figure 3:
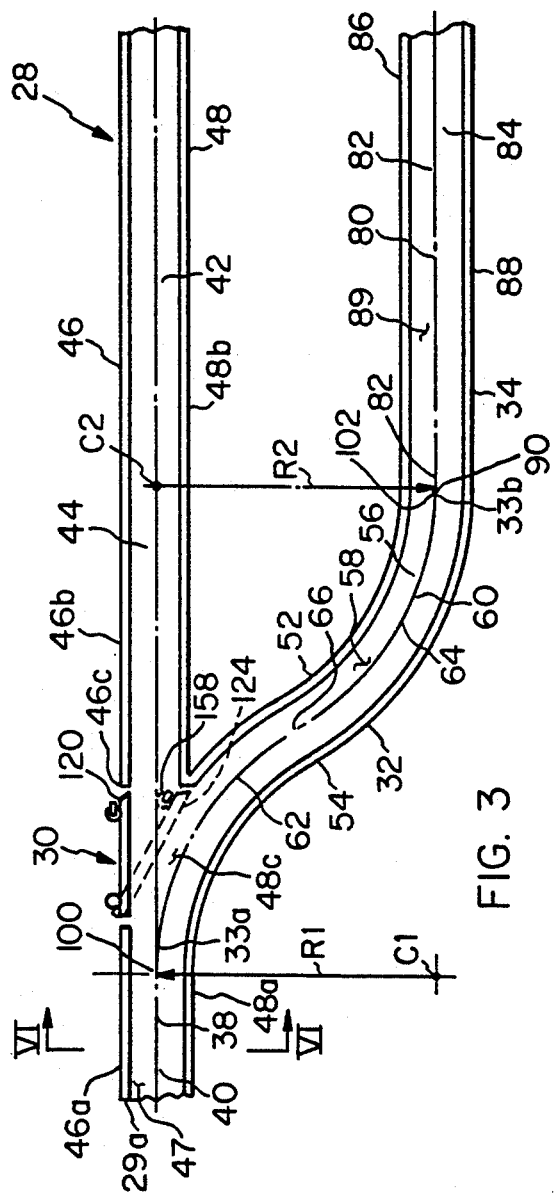
FIG. 3 is a top view of a portion of the arrangement schematically shown in FIG. 2 of a first conveying table, the connecting table and a second conveying table made in connection with the present invention.

As shown in FIG. 3, the conveying table 28 extends along a first longitudinal axis 38. The axis 38 includes an upstream end 40 and a downstream end 42. The conveying table 28 includes a base 44 and two sidewalls 46 and 48 attached to the base 44, which defines a passageway 47. The conveying table base 44 preferably includes rollers (not shown). Sidewalls 46 and 48 are spaced a distance apart from each other and the base 44 is generally level. Tubular products travel along passageway 47 from the upstream end 40 toward the downstream end 42 along base 44. Sidewalls 46 and 48 guide the tubular product. Wall 46 includes an upstream portion 46a and the downstream portion 46b. A gap 46c separates portions 46a and 46b. Likewise, wall 48 includes an upstream portion 48a, a downstream portion 48b and a gap 48c separating portions 48a and 48b.

Connecting table 32 includes two spaced apart sidewalls 52 and 54 attached to a base 56, which defines a passageway 58. Connecting table base 56 preferably includes rollers (not shown). The passageway 58 of the connecting table 32 is in the shape of a reverse curve or S-curve and has a center axis 60 in the shape of a reverse curve. Axis 60 is defined by two arcs 62 and 64 having respective centers C1 and C2 that are located on opposite sides of the connecting table 32 with C1 positioned closer to the upstream end 29a than C2. First arc 62 and second arc 64 have radii R1 and R2, respectively, that intersect at an intersection point 66. Preferably R1 equals R2.

The conveying table 34 extends along a longitudinal axis 80. Axis 80 includes an upstream end 82. The conveying table 34 includes a base 84 and two spaced apart sidewalls 86 and 88 attached to the base 84 that defines a passageway 89. Conveying table base 84 preferably includes rollers (not shown). An upstream end 90 of the conveying table 34 attaches to a downstream end 33b of the connecting table 32.

Axes 38, 60 and 80 of tables 28, 32 and 34, respectively, intersect with each other. Specifically, first arc 62 intersects longitudinal axis 38 at intersection point 100. Second arc 64 intersects longitudinal axis 80 at intersection point 102. Preferably, the tangent of the first arc 62 at point 100 is parallel to axis 38, the tangent of arc 64 at point 102 is parallel to axis 80 and axes 38 and 80 are parallel to each other. Further, wall 48a attaches to wall 54, wall 48b attaches to wall 52, and gap 48c defines the entrance to the connecting table 32.

The diverter 30 includes a two-positioned diverter arm 120 that rotatably attaches to the conveying table 28 and is positioned within the gap 46c. The diverter arm 120 can either be moved into position manually by an operator or activated by an activating means such as an air or a hydraulic piston arm. In the first position, the diverter arm 120 is parallel with the longitudinal axis 38 and forms a part of sidewall 46. In the second position, the diverter arm forms a part of the connecting table sidewall 52.

Figure 7:
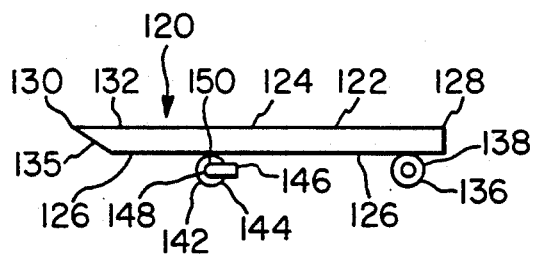
FIG. 7 is a top view of the diverting arm shown in FIGS. 3-6.
Figure 8:
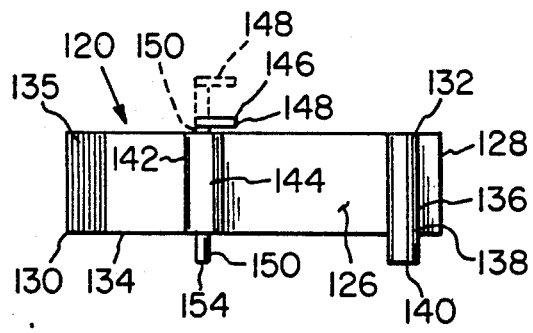
FIG. 8 is a side view of the diverting arm shown in FIG. 7.
Figure 9:
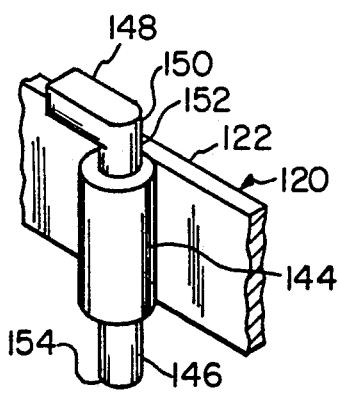
FIG. 9 is top perspective view of a portion of the diverting arm shown in FIG. 7.

The diverter arm 120, as shown in FIGS. 7-9, includes a substantially flat plate 122 having an inner surface 124, an outer surface 126, a first end 128, a second end 130, an upper edge 132 and a lower edge 134. A slanting surface 135 forms a tip with surface 122 at end 130. Preferably the angle between surfaces 122 and 130 is about 72°. A hinge 136 is attached to surface 126 adjacent end 128. The hinge 136 includes a tube 138 welded to surface 126. A bottom portion 140 of tube 138 extends below edge 134 and pivotably attaches to the conveying table 28 through a bearing arrangement not shown.

A locking mechanism 142 is attached to surface 126 intermediate the ends 128 and 130. The locking mechanism 142 includes an open-ended hollow tube 144 attached to surface 126 intermediate ends 128 and 130. The tube extends from edges 132 to 134. As shown in FIGS. 7-9, tube 144 slideably receives a locking pin 146 that includes a handle 148 and a cylindrical shaft 150. The shaft 150 includes an upper end 152 and a lower end 154 and is longer than the height of the plate 122 defined by edges 132 and 134. Handle 148 is attached to the upper end 152 and is positioned above tube 144. Lower end 154 of the locking pin 146 extends below the plate edge 134 when the handle 148 rests upon the upper end of the tube 144 adjacent plate edge 132.

The base 44 of the conveying table 28 includes two holes 156 and 158 each of which has a diameter slightly larger than the outer diameter of shaft 150. When the diverter arm 120 is in the first position, the lower end 154 of shaft 150 passes through hole 156 so that the plate inner surface 124 is parallel to axis 38 and the plate 122 forms a part of sidewall 46 and passageway 47. When the diverter arm 120 is in the second position, the lower end 154 of shaft 148 passes through hole 158 so that the plate inner surface 124 forms a part of wall 52 and passageway 58 and blocks passageway 47, and surface 135 of plate 122 is positioned adjacent junction end 159 of walls 48b and 52. To move the arm 120 from the first position to the second position, the handle 148 is raised lifting the shaft lower end 154 above hole 156, as shown in phantom in FIG. 8. Then the diverter arm 120 is rotated to the second position and the shaft lower end 154 is lowered into hole 158. The process is reversed when moving the diverter arm 120 from the second position to the first position.

Figure 10:
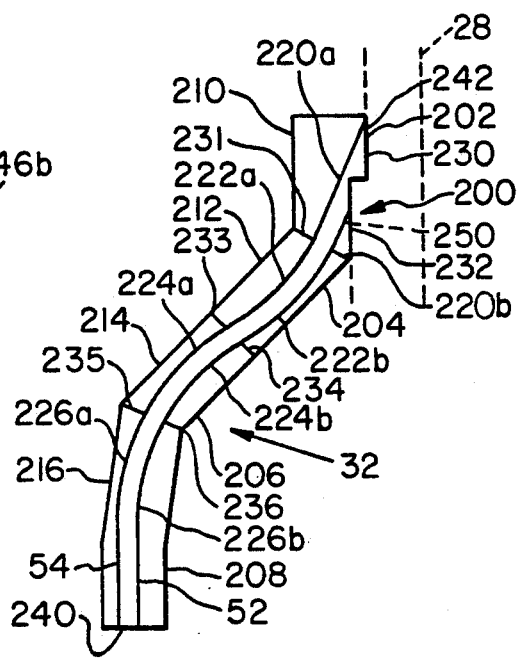
FIG. 10 is a top view of the connecting table made up of a plurality of connecting segments.

The connecting table 32 can be a segmented table 200 formed by a plurality of segments 202, 204, 206 and 208 as shown in FIG. 10. Each segment includes a flat base 210, 212, 214 and 216 and sidewalls 220a, 220b, 222a, 222b, 224a, 224b, 226a and 226b. Respective segments 202, 204, 206 and 208 have ends 230, 231, 232, 233, 234, 235, 236 and 240. Ends 231 and 232; 233 and 234; and 235 and 236 abut when segments 202, 204, 206 and 208 are connected to each other, and the respective walls form sidewalls 52 and 54. End 230 of segment 202 corresponds to upstream end 33a and end 240 of segment 208 corresponds to end 33b. A notched edge 242 defines end 230.

To install the segmented table 200, a notch, which corresponds in shape to end 230, is cut in table 28 forming a notched edge 250, as shown in phantom in FIG. 10. End 230 abuts edge 250 and segment 202 attaches to conveying table 28. Further, in cases where the welding and forming line has been in use for some time before installation of the connecting table 32 and stretch reducing mill 36, then a portion of wall 46 is also removed, forming gap 46c, so that diverter 30 can be installed. Finally, the upstream end of conveying table 34 abuts end 240 and segment 208 attaches to conveying table 34.

Figure 11:
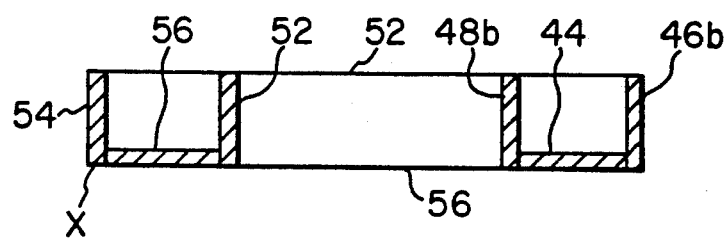
FIG. 11 is a side view, partially in section, of the connecting table base at a constant elevation.
Figure 12:
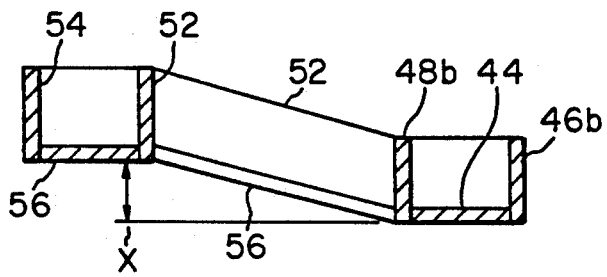
FIG. 12 is a side view, partially in section, of the connecting table base at varied elevations.

Whether connecting table 32 is made from a plurality of segments or not, the base 84 of the connecting table 32 can be at a constant elevation or can be at a varied elevation from a reference plane X, as shown in FIGS. 11 and 12. Thus, the connecting table can easily accommodate a forming and welding mill and a stretch reducing mill at various elevations.

Figure 4:
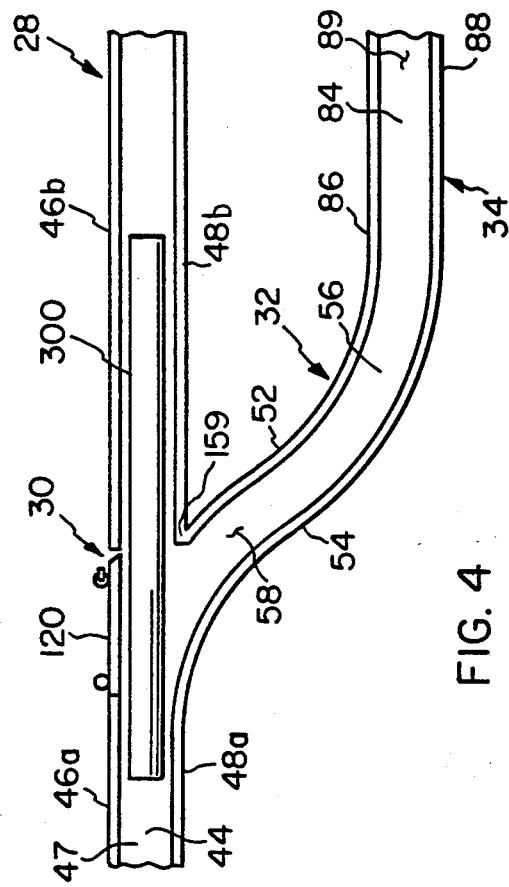
FIG. 4 is a top view of the first table, the connecting table and the second conveying table shown in FIG. 3 with a diverting arm in a first position and with a metal tubular product travelling on the first conveying table.

In operation, when the tubular sections are not passing through the stretch reducing mill, skelp passes through the furnace 22, which heats the skelp to a hot working temperature. The skelp then passes through a welding and forming mill 24 which then hot works and forms the skelp into a straight elongated tubular section 290. The tubular section passes through a hot saw 26 which cuts the tubular section into cut pieces 300. The cut pieces 300 of the straight and elongated tubular sections pass along the upstream section of the conveying table 28. The diverter arm 120 remains in the first position and no further hot working of the tubular section is required and the cut tubular sections pass along the downstream side of the conveying table 28 so that they may be placed on a cooling rack, as shown in FIG. 4.

Figure 5:
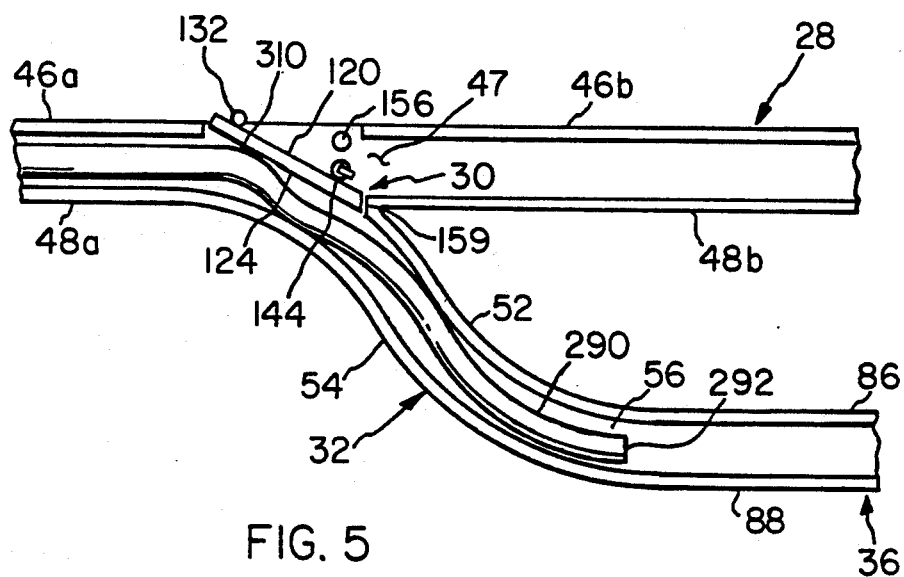
FIG. 5 is a top view of the table arrangement shown in FIG. 4 with the diverter arm in a second position and with the metal tubular product travelling on the connecting table.
Figure 6:
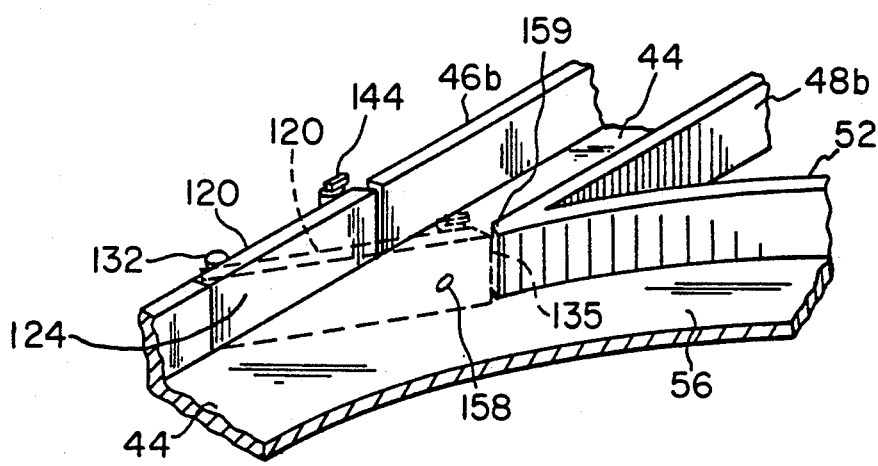
FIG. 6 is a top perspective view of a partial section of a portion of the connecting table and the first conveying table.

If it is determined to divert the tubular section 290 because it requires subsequent hot working in the stretch reducing mill, the operator activates the diverter 30 and moves the diverting arm 120 into the second position as discussed hereinabove, whereby the diverting arm 120 blocks passageway 47 and a leading end 292 of the tubular section 290 contacts an inner surface 124 of plate 122 and is deflected onto the connecting table through the reverse curve, as shown in FIG. 5. The tubular section 290 is not cut by the hot saw 26. A second hot saw 400 is placed downstream from stretch reducing mill 36 to cut the tubular section 290 after it has been reduced. The tubular section 290 is deformed as it passes through the reverse curve of the connecting table 32. However, the tubular section 290, which was heated to a sufficient temperature by the furnace 22, is still at a hot working temperature and thereby leaves the connecting table 32 in a substantially straight elongated round state by contacting the walls of the connecting table 32, so that the tubular section 290 can enter the stretch reducing mill to be further hot worked. The momentum of the tubular section 290 leaving the conveying table 28 is sufficient to carry the tubular section 290 through the connecting table 32 and into the stretch reducing mill 36.

The use of the reverse curve connecting table 32 consolidates space in a mill environment and further eliminates the need to reheat the tubular products to be hot worked prior to entering the stretch reducing mill. Further, the stretch reducing mill can be added to an existing welding and forming mill with minimal shutdown time of the welding and forming mill because installation of the diverter 30 and connecting table 32 are the only components that will affect the continued operation of the welding and forming mill 24 during installment of the stretch reducing mill line.

Figure 13:
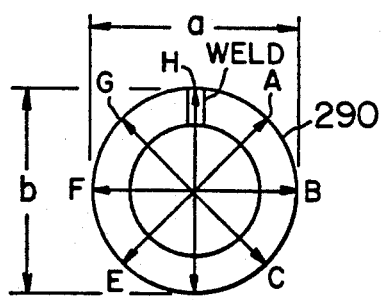
FIG. 13 is a side view of the metal tubular product shown in FIG. 5 after it passes through the connecting table.

An actual prototype has been made and tested where R1 and R2 are 15 feet. The following examples, with reference to FIG. 13, illustrate sample dimensional readings in inches on tubular products after passing through the connecting table 32.

EXAMPLE 1

0.215 Gage
A, B, C, D, E, F, G and H are spaced 45° apart.

| Outer diameter | Wall thickness |
|---|---|
| SAMPLE #1 | |
| A-E = 4.571 | A = .255 |
| B-F = 4.564 | B = .242(WELD) |
| C-G = 4.535 | C = .229 |
| D-H = 4.580 | D = .220 |
| | E = .214 |
| | F = .217 |
| | G = .230 |
| | H = .229 |
| SAMPLE #2 | |
| A-E = 4.566 | A = .224 |
| B-F = 4.536 | B = .215 |
| C-G = 4.581 | C = .224 |
| D-H = 4.580 | D = .219 |
| | E = .229 |
| | F = .250(WELD) |
| | G = .226 |
| | H = .225 |
| SAMPLE #3 | |
| A-E = 4.524 | A = .226 |
| B-F = 4.509 | B = .227 |
| C-G = 4.567 | C = .228 |
| D-H = 4.662 | D = .228 |
| | E = .223 |
| | F = .227 |
| | G = .228 |
| | H = .222 |
| SAMPLE #4 | |
| A-E = 4.527 | A = .219 |
| B-F = 4.446 | B = .217 |
| C-G = 4.538 | C = .215 |
| D-H = 4.656 | D = .224 |
| | E = .221 |
| | F = .229 |
| | G = .230 |
| | H = .242(WELD) |
| SAMPLE #5 | |
| A-E = 4.531 | A = .215 |
| B-F = 4.531 | B = .218 |
| C-G = 4.561 | C = .225 |
| D-H = 4.612 | D = .227 |
| | E = .228 |
| | F = .225 |
| | G = .215 |
| | H = .217 |

EXAMPLE 2

0.146 Gage

| Outer diameter | Wall thickness |
|---|---|
| SAMPLE #1 | |
| A-E = 4.573 | A = .157 |
| B-F = 4.573 | B = .150 |
| C-G = 4.516 | C = .149 |
| D-H = 4.555 | D = .151 |
| | E = .153 |
| | F = .154 |
| | G = .153 |
| | H = .148 |
| SAMPLE #2 | |
| A-E = 4.566 | A = .152 |
| B-F = 4.497 | B = .152 |
| C-G = 4.497 | C = .149 |
| D-H = 4.614 | D = .142 |
| | E = .148 |
| | F = .149 |
| | G = .146 |
| | H = .150 |
| SAMPLE #3 | |
| A-E = 4.455 | A = .147 |
| B-F = 4.442 | B = .147 |
| C-G = 4.627 | C = .144 |
| D-H = 4.648 | D = .144 |
| | E = .152 |
| | F = .146 |
| | G = .148 |
| | H = .153 |
| SAMPLE #4 | |
| A-E = 4.558 | A = .151 |
| B-F = 4.191 | B = .143 |
| C-G = 4.713 | C = .145 |
| D-H = 4.820 | D = .146 |
| | E = .148 |
| | F = .149 |
| | G = .151 |
| | H = .152 |
| SAMPLE #5 | |
| A-E = 4.488 | A = .151 |
| B-F = 4.553 | B = .145 |
| C-G = 4.610 | C = .144 |
| D-H = 4.542 | D = .154 |
| | E = .149 |
| | F = .147 |
| | G = .154 |
| | H = .146 |

Having described the presently preferred embodiments of our invention, it is to be understood that it may otherwise be embodied within the scope of the appended claims.

We claim:

1. An apparatus for hot working metal products exiting a first mill, wherein the metal products exit the first mill in a hot working state comprising:
a first conveying table attached to a first mill and having a first passageway through which the metal products pass;
a second mill for hot working the metal products; and
a connecting table connecting said first conveying table to said second conveying table for transferring metal products in a hot working state from the first mill to said second mill, including a base having a first end and a second end, said first end attached to the first conveying table and said second end attached to the second conveying table, two spaced apart sidewalls attached to said base and a passageway defined by said base and said sidewalls, said passageway of said connecting table is in the shape of a reverse curve, and has an axis in the shape of a reverse curve having two arcs whose centers are located on opposite sides of said connecting table, one arc containing said first end of said connecting table and the other arc containing said second end of said connecting table.

2. Apparatus as claimed in claim 1 further comprising a diverter attached to the first table for diverting the metal product travelling down the first conveying table onto said first end of said connecting table so that said metal product can pass along said connecting table onto said second conveying table, said diverter comprising a two-positioned diverting arm that blocks the first passageway in a first position and diverts the metal product from the first conveying table to said connecting table.

3. Apparatus as claimed in claim 1 wherein the first conveying table has an upstream end and a downstream end, said first end of said connecting table is positioned between said upstream end and said downstream end of said first conveying table and the center of the first arc of said connecting table positioned closer to the upstream end of the first conveying table than the center of the second arc of said connecting table, and said two arcs having equal radii.

4. Apparatus as claimed in claim 2 wherein said diverter arm is pivotally attached to the first conveying table, whereby when said arm is in the second position the metal product travels only down the first conveying table and bypasses said connecting table and when said arm is in the first position the metal product contacts said diverter arm and is diverted from the first conveying table onto the connecting table.

5. Apparatus as claimed in claim 4 wherein the first conveying table includes a base and two spaced apart sidewalls attached to the base and when the diverter arm is in the second position it forms a portion of one of the first conveying table sidewalls.

6. Apparatus as claimed in claim 5 wherein the diverter arm forms a portion of one of said sidewalls of said connecting table when the diverter arm is in said first position.

7. Apparatus as claimed in claim 1 wherein said connecting table is made of a plurality of segments each of which has two spaced apart walls attached to a base, whereby respective segments are attached to one another.

8. Apparatus as claimed in claim 1 wherein said base of said connecting table remains at a constant elevation.

9. Apparatus as claimed in claim 1 wherein said base of said connecting table has a varied elevation.

10. Apparatus as claimed in claim 2 wherein said diverter arm comprises a substantially flat plate having an inner surface and an outer surface, said inner surface being adapted to contact and divert the metal product, and said diverter further includes:
a hinge attached to the outer surface of said diverter arm; and
a locking mechanism attached to said diverter arm.

11. In combination:
a first mill for producing metal product in a hot working state;
a first conveying table for said first mill, the first conveying table having a passageway through which metal products pass;
a second mill for hot working the metal product without reheating the metal product;
a second conveying table for said second mill;
a connecting table for transferring metal products in a hot working state from the first mill to the second mill, said connecting table attached to said first conveying table and said second conveying table, said connecting table comprising:

a base having two spaced apart sidewalls attached to said base; and
a passageway defined by said base and said sidewalls, a first end and a second end, said first end being attached to the first conveying table and the second end being attached to the second conveying table, said passageway of said connecting table being in the shape of a reverse curve and having an axis in the shape of a reverse curve with two arcs whose centers are located on opposite sides of said connecting table, one arc containing said first end of said connecting table and the other arc containing said second end of said connecting table.

12. The combination as claimed in claim 11 wherein said first mill is a welding and forming mill and the second mill is a stretch reducing mill.

13. A method for transferring a metallic tubular product from one mill to another mill, comprising:
heating a substantially straight elongated metallic tubular product into a hot working state;
passing said tubular product in the hot working state along a first conveying table;
diverting said tubular product in the hot working state from said first conveying table onto a connecting table substantially having the shape of a reverse curve;
passing said metal piece in the hot working state through said connecting table; and
passing said tubular product along a second conveying table while said tubular product is still at a hot working state.

14. A method as claimed in claim 13 wherein said tubular product passes through a welding and forming mill before being diverted and the tubular product passes through a stretch reducing mill after passing through the connecting table.

15. A method as claimed in claim 14 wherein said tubular product at a hot working state passes directly from said connecting table to said second conveying table and said reducing mill without passing said tubular product through a furnace.

16. A method as claimed in claim 14 further comprising cutting said elongated tubular product into a plurality of elongated pieces before being passed along said first conveying table.

17. A method as claimed in claim 13 further comprising:
determining when said elongated tubular product should be diverted to said second conveying table; and
activating a diverter to divert said tubular product.

18. A combination for transferring a metallic tubular product, the combination comprising:
a first mill;
a second mill;
a first means for passing a metallic tubular product from said first mill;
a second means for passing tubular product to said second mill; and
means for diverting the tubular product from the first means to the second means, said second means having the shape of a reverse curve.

19. The apparatus of claim 1 wherein said first mill is a welding and forming pipe mill and said second mill is a stretch reducing mill.

20. The combination of claim 11 wherein said first mill is a welding and forming pipe mill and said second mill is a stretch reducing mill.

* * * * *